United States Patent
Fuente

(10) Patent No.: US 7,836,215 B2
(45) Date of Patent: Nov. 16, 2010

(54) METHOD FOR PROVIDING HIGH PERFORMANCE STORAGE DEVICES

(75) Inventor: Carlos Francisco Fuente, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 11/373,624

(22) Filed: Mar. 10, 2006

(65) Prior Publication Data

US 2006/0230216 A1    Oct. 12, 2006

(30) Foreign Application Priority Data

Mar. 23, 2005    (GB) ................................. 0505926.6

(51) Int. Cl.
*G06F 3/00* (2006.01)
*G06F 12/00* (2006.01)

(52) U.S. Cl. .................. 710/14; 710/310; 711/161; 711/162; 714/E11.101

(58) Field of Classification Search ................. 711/162; 710/14, 310
See application file for complete search history.

(56) References Cited

U.S. PATENT DOCUMENTS

| | | | | |
|---|---|---|---|---|
| 5,515,502 A * | 5/1996 | Wood | ............................ | 714/15 |
| 5,594,883 A * | 1/1997 | Pricer | .......................... | 711/113 |
| 5,862,409 A * | 1/1999 | Yoshimoto et al. | ............. | 710/57 |
| 5,941,963 A * | 8/1999 | Charles et al. | ................. | 710/62 |
| 6,073,220 A * | 6/2000 | Gunderson | .................... | 711/162 |
| 6,175,904 B1 * | 1/2001 | Gunderson | .................... | 711/162 |
| 6,418,508 B1 * | 7/2002 | Saito | ........................... | 711/112 |
| 6,526,515 B1 * | 2/2003 | Charles et al. | .............. | 713/300 |
| 6,675,177 B1 * | 1/2004 | Webb | .......................... | 707/200 |
| 6,721,317 B2 * | 4/2004 | Chong, Jr. | .................... | 370/389 |
| 6,728,716 B1 * | 4/2004 | Bhattacharya et al. | ......... | 707/10 |
| 2002/0023198 A1 * | 2/2002 | Kokubun et al. | ............. | 711/162 |
| 2003/0065780 A1 * | 4/2003 | Maurer et al. | ................ | 709/225 |
| 2003/0159012 A1 * | 8/2003 | Hirakata et al. | ............... | 711/162 |
| 2006/0095696 A1 * | 5/2006 | Amano et al. | ................ | 711/162 |
| 2006/0200639 A1 * | 9/2006 | Levy et al. | ................... | 711/162 |

OTHER PUBLICATIONS

'Disaster Recovery with IPStor' Application Note, FalconStar Software, 2001-2002.*

* cited by examiner

*Primary Examiner*—Henry W Tsai
*Assistant Examiner*—Steven G Snyder
(74) *Attorney, Agent, or Firm*—Harrington & Smith

(57) ABSTRACT

The exemplary embodiments of this invention provide in one non-limiting aspect thereof a control device operable to execute a filter layer, and includes a first interface for coupling to a first storage device and a second interface for coupling to a second storage device. The filter layer receives communications and, in a first mode, synchronously transmits the communications to the first storage device and asynchronously transmits the communications to the second storage device, and, in a second mode, synchronously transmits the communications to the second storage device.

1 Claim, 3 Drawing Sheets

METHOD FOR PROVIDING HIGH PERFORMANCE STORAGE DEVICES

FIELD OF THE INVENTION

The exemplary embodiments of this invention relate to a data processing system and method. In one example of the system, asynchronous replication is used in mobile devices to improve reliability, performance and manageability.

BACKGROUND OF THE INVENTION

Laptop computers contain processors and memory, which in many cases are comparable in terms of performance with those in desktop machines. But the hard drives in laptop computers are typically significantly slower than those in desktop machines. This is because of the constraints in terms of power, cooling, and vibration tolerance that are required of a laptop computer.

As a result, hard drive performance is often the most significant limit in performance of laptop computers, when compared to desktop machines. This can be observed, when using a portable computer, in the time taken to boot a system, or in the time taken to execute a data intensive application. Often, these limits in performance are perceived for short periods only such as when an application is started, with the drive idle for significant periods in between. But, these periods are costly because the user is often left waiting for their duration.

It is possible to boot a laptop from a higher performing hard drive via a docking station, and then receive the performance of that class of drive. But, once booted, it is not possible to remove the laptop from the docking station without shutting down. Once undocked, the data in the hard drive is inaccessible.

SUMMARY

The exemplary embodiments of this invention provide in one non-limiting aspect thereof a control device operable to execute a filter layer and comprising a first interface for coupling to a first storage device and a second interface for coupling to a second storage device. The filter layer receives communications and, in a first mode, synchronously transmits the communications to the first storage device and asynchronously transmits the communications to the second-storage device, and, in a second mode, synchronously transmits the communications to the second storage device.

The exemplary embodiments of this invention provide in another non-limiting aspect thereof a method comprising receiving communications at a filter layer, in a first mode transmitting synchronously the communications to a first storage device and transmitting asynchronously the communications to a second storage device, and in a second mode transmitting synchronously the communications to the second storage device.

The exemplary embodiments of this invention provide in a further non-limiting aspect thereof a computer program product embodied on a computer readable medium for controlling a control device. The computer program product comprises instructions for receiving communications at a filter layer, in a first mode transmitting synchronously the communications to a first storage device and transmitting asynchronously the communications to a second storage device, and in a second mode transmitting synchronously the communications to the second storage device.

BRIEF DESCRIPTION OF THE DRAWINGS

Embodiments of the invention will now be described, by way of example only, with reference to the accompanying drawings, in which.

DETAILED DESCRIPTION

Figure 1:
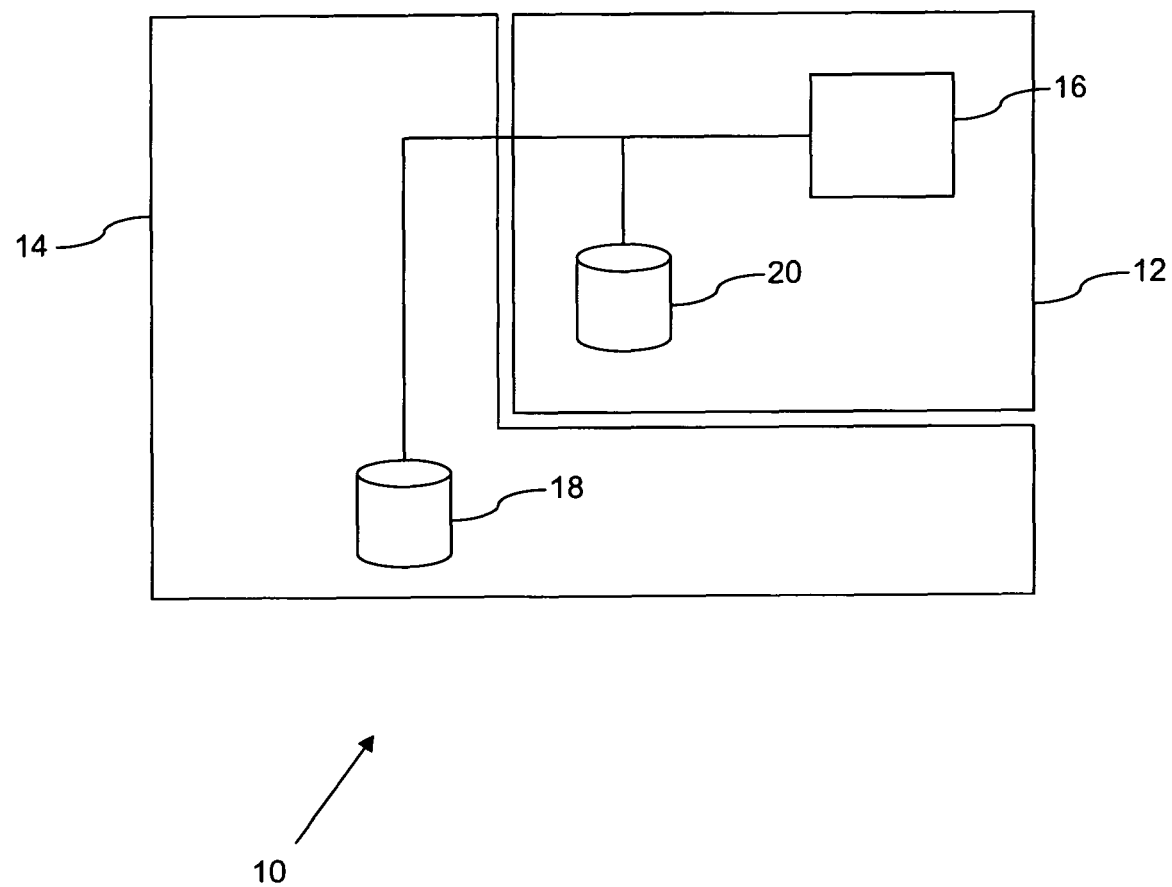
FIG. 1 is a schematic diagram of a data processing system.

An exemplary embodiment of a data processing system 10 includes a portable computer 12 (such as a standard laptop computer) and a docking station 14. The docking station 14 is configured to cooperate with the laptop 12. The laptop 12 includes a control device 16 and a storage device 20. The docking station 14 includes a storage device 18. It will be appreciated that many components of the laptop 12 and docking station 14 have been omitted for ease of explanation. The control device 16 is the processor and RAM of the laptop 12 that is running the operation of the laptop 12. The two storage devices 18 and 20 are the hard disk drives of the docking station 14 and laptop 12 respectively.

The control device 16 of the laptop 12 is executing an operating system and a filter layer. Depending upon the operating system and the setup of the laptop, the filter layer may be loaded as a module within the operating system or may be a separate layer in the software stack. The filter layer is receiving communications (I/Os—inputs and outputs) from the operating system and is routing those communications, through a device driver, to the storage devices 18 and 20.

The filter layer manages the asynchronous remote copy link between the two disks 18 and 20. This filter layer is active during boot of the operating system, and the filter layer hides the existence of the two drives 18 and 20 and makes just one of the drives visible to the operating system.

The initial state is that the laptop drive 20 already holds a copy of the operating system, and then becomes aware that a new docking station drive 18 is accessible, when the portable computer 12 is docked with the station 14. The first process that takes place is that the contents of the laptop drive 20 are copied to the docking station drive 18 to ensure that they are synchronized. The filter layer manages the copy of data from laptop 12 to docking station drive 18, while tracking any further updates to the laptop drive 20 using a bitmap or equivalent technology. Though the system 10 can still be active and perform I/O, this entire operation is best performed during a quiet period, such as overnight, since the load on the laptop drive 20 will be significant.

Once the docking station drive 18 is nearly up-to-date, the filter layer enters a synchronous update mode, where all writes (communications) are mirrored to both docking station and laptop drives 18 and 20. At the point where the drives are in sync, save for any active write operations, the filter layer automatically performs a switch to a mode in which I/Os are routed to the docking station drive first, I/Os are routed through the filter layer and the host I/O is completed as soon as the docking station 18 drive completes. The control device 16, executing the filter layer, in this first mode, synchronously transmits the communications to the first, docking station, storage device 18 and asynchronously transmits the communications to the second, laptop, storage device 20.

The filter layer ensures that I/Os are applied to the laptop drive 20 in a consistent order. The filter layer maintains a record of all I/Os that remain to be applied. This layer is capable of maintaining a copy of data that is to be applied independently of the operating system. During this period the user will experience performance equivalent to the docking station drive.

To undock, the system executes a process where the contents of the filter layer are flushed out to the laptop drive 20, while still being able to perform I/O. Once the filter layer has completed the flush, the laptop 12 can be removed and the operating system continues operation writing only to the laptop drive 20, operating in a second mode of a synchronous connection to the laptop drive 20. A record is kept of those areas that are changed with respect to the docking station drive 18.

When the system is re-docked, a process similar to that for initial synchronization is performed, except it only needs to copy those areas changed since the previous undock. This process will cause the docking station drive image to be inconsistent—it can no longer be used to support boot in the event of a failure. Alternatively, the resynchronization process can be enhanced so as to retain a consistent image at the docking station drive throughout, for instance by taking a FlashCopy® of the initial image of the docking station drive, though this will increase the amount of I/O and hence duration of the resynchronization process (FlashCopy is a registered trademark of the International Business Machines Corporation).

System boot is normally performed from whatever drive was the primary device when the system was last shutdown. However, if that drive should fail, then an override mechanism is applied during system boot to allow the other disk to be made the primary instead. The operating system's normal file system checking code is then invoked to recover the operating system, with results similar to those for a recovery following a sudden power failure.

Figure 2:
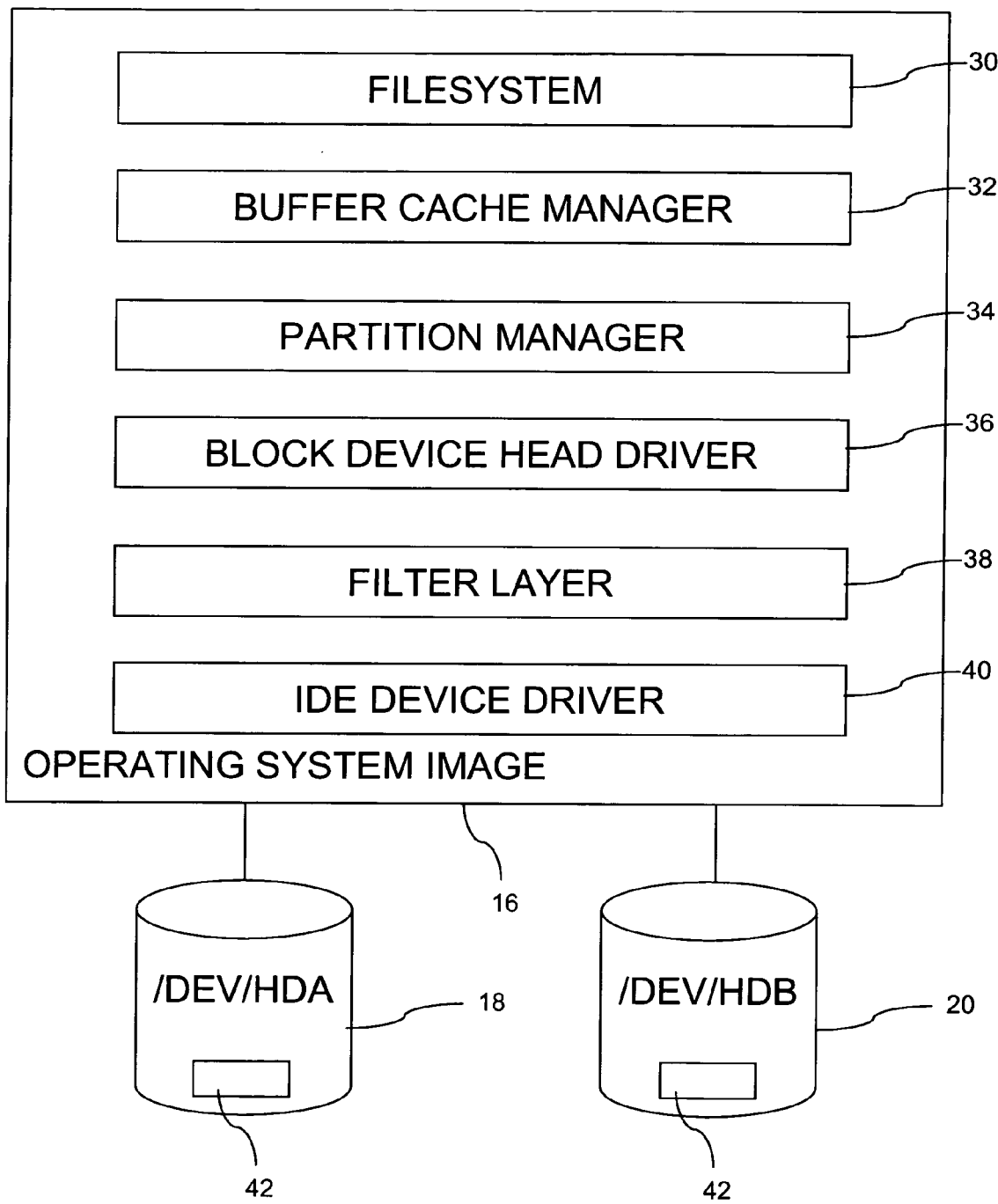
FIG. 2 is a schematic diagram of a portion of the data processing system of FIG. 1.
Figure 3:
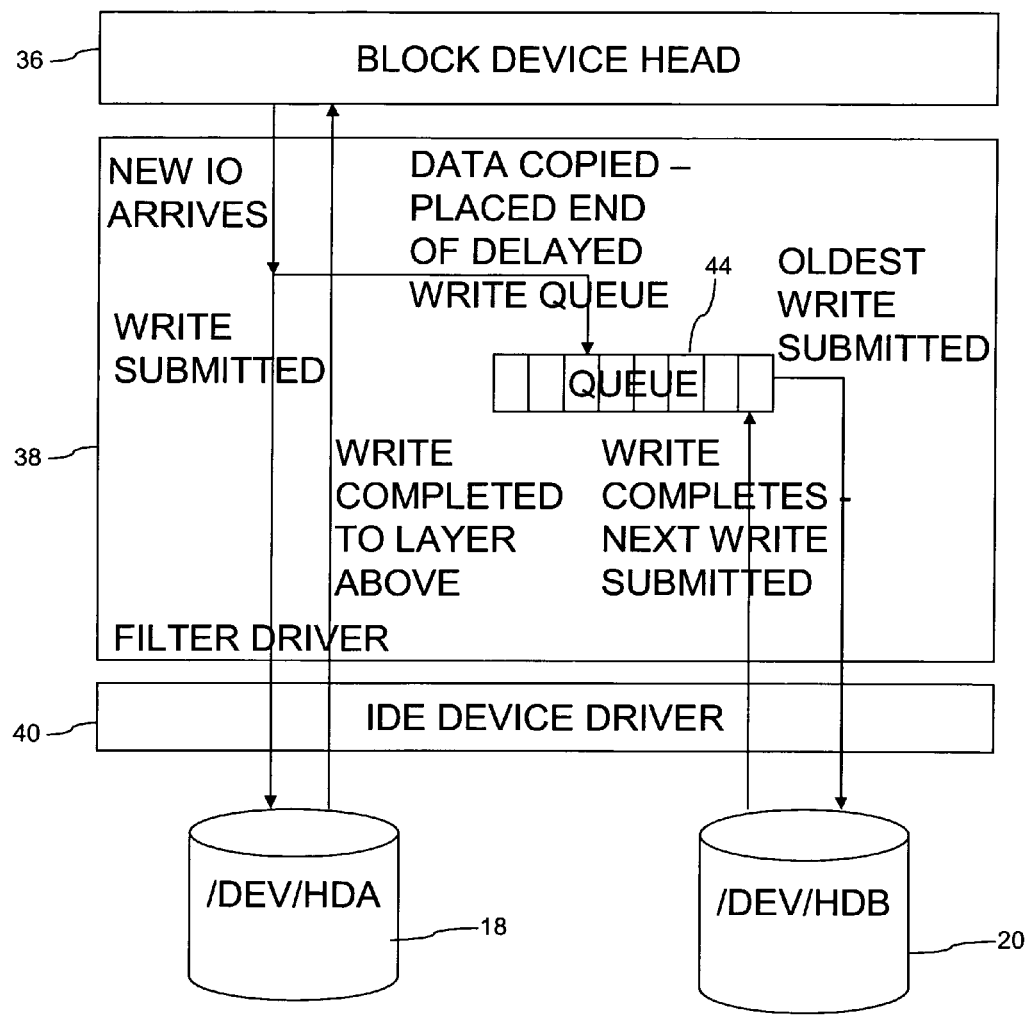
FIG. 3 is a view similar to FIG. 2, of a portion of the data processing system of FIG. 1.

FIGS. 2 and 3 show in more detail a sample embodiment of the system discussed above. There are many implementation options available which embody this filter layer. A consideration for any given embodiment is the operating system which is installed on the laptop 12. This may include operating systems like those of the Windows™ family, a version of Linux™ or others. The embodiment fits into that operating system environment which will cause implementations to vary.

Even within an operating system, there are many implementation choices available. One option is to integrate the software into the base operating system code. Another is to leverage various operating systems' capability to insert 'filter' drivers into the device driver stack for the operating system, which would allow any software vendor to implement the filter layer. A further option which is becoming available is to integrate the filter layer's function into the host operating system of a virtual machine implementation, such as that offered by VMWare™. In this way, the benefit of the filter layer would be available to hosted virtual machines, though not necessarily to the host operating environment itself.

There follows a description of an example embodiment in a simplified Linux-like operating system environment. The key algorithms of this code are implemented in a driver layer that operates within the operating system block device stack. The layers of this stack (from the point of view of performing disk-based I/Os) are a file system 30, buffer cache manager 32, partition manager 34, block device head driver 36, filter layer 38 and IDE (integrated drive electronics) device driver 40. The file system 30 provides facilities to provide files and directory management to the applications hosted by the operating system. The buffer cache manager 32 provides memory management facilities for file caching, including memory paging (swapper) facilities. The partition manager 34 provides coarse disk level management, enabling a large disk to be carved into contiguous pieces for different needs, including swap space, varying file system implementations, and boot records.

The block device head driver 36 generates and submits block read and write I/Os to the block devices that belong to the system, based on requests received from the layers above. The filter layer 38 converts these to the protocols that follow. The IDE device driver 40 maps these to the command set of the IDE architecture and protocols, and delivers these to the hardware interface that attaches the computer to the IDE devices themselves.

There are many alternative implementations possible, and it is also possible to have more sophisticated arrangement within a single computer system, for instance by substituting SCSI, FibreChannel and SCSI, or Gigabit Ethernet and iSCSI and other block device architectures for one or both of the disk interfaces.

The software stack that is depicted in FIG. 2 is stored in an image on disk that is read in as part of system boot. This will normally include the filter layer driver 38 too, since the boot image will normally be resident on the same disk drive(s), but that need not necessarily be the case. The operating system image including filter device driver layer 38 will be read in during the operating system's initial boot sequence and then will be resident memory for the duration of the computer's operation.

The filter driver 38 intercepts those accesses to the two disk images (or pairs of disk images, in more complex systems), one corresponding to the laptop drive, and one corresponding to the docking station drive. The filter later 38 masks the existence of these two drives and presents just a single disk drive image to the operating system. In some operating systems this might be done by presenting an entirely new disk image to the operating system. In others this might be performed by using one of the existing images, and masking or suppressing the existence or accessibility of the other from the operating system.

The filter driver maintains some configuration information 42 within the space of the two disk images. In the example here it is presumed that this is kept in a few sectors at the end of the disk which is hidden from view to the operating system by the operation of the filter layer 38. As an alternative, this data could be placed in a special partition of the drive which is known to the operating system but opaque to the OS, or in a region which belongs to the operating system but is known by design is not normally accessed.

The configuration record 42 tracks the state of the mirror operation between the two disks 18 and 20. This includes the identity of the other disk in the mirror pair, whether the two disks are synchronized (the state normally reached during a managed power-down of the system, or during periods of inactivity) or unsynchronized (the normal condition during active running of the system), and if unsynchronized which of the two disks is more up-to-date. The configuration record 42 may also track which regions of the disk are unsynchronized which is discussed in more detail below.

FIG. 3 illustrates the operation of the filter layer 38 for I/Os in normal conditions, where the docking station drive 18 is up-to-date and the laptop drive 20 is nearly up-to-date. For a read I/O, when the I/O arrives at the filter layer 38 a check is made as to which of the two disks is more up-to-date, in this example the docking station drive, and the I/O is then forwarded to be processed at that disk. The completion of the I/O is returned to the layer above in the operating system without further intervention.

For a write I/O, the I/O is delivered to the docking station drive 18, and in parallel with that processing, a copy of the data written is taken into a portion of a memory buffer that is reserved by the filter driver 38, and an I/O is added to a queue 44 to be submitted to the laptop drive 20 referencing that region of memory. When the write I/O to the docking station drive 18 completes, the I/O is completed to the operating system, even in the common case where the I/O to the laptop drive 20 has yet to complete.

The queue 44 of write I/O to the laptop drive is processed in such a way as to maintain consistency. The simplest algorithm to achieve this is to submit the I/Os to the laptop drive 20 one at a time in the order they were received by the filter layer 38. In this case the queue 44 is managed on a first-in-first-out basis. Only the earliest, by time of arrival, write I/O is submitted to the laptop drive 20 to be processed. When this write I/O completes, then the buffer associated with the I/O is freed and that memory made available for a newly arriving write I/O, and the next oldest write I/O in the queue is submitted to the laptop drive.

More sophisticated algorithms are possible which can allow for multiple I/Os to be submitted to the laptop drive 20 concurrently. Depending on the drive's implementation this may allow for greater throughput on the laptop drive 20. Preferentially, such algorithms should retain consistency by ensuring that only I/Os that were received and active concurrently from the point of view of the operating system, are active concurrently on the laptop drive 20.

In this fashion, the laptop 12 and its associated applications operate as if they were attached only to the high-speed docking station drive. The laptop drive 20 is kept up-to-date (asynchronously) without delaying application operation.

Normally under steady use, the laptop drive 20 is likely to be less than a few seconds behind. But, in periods of sustained heavy use, the backlog on the laptop drive 20 can grow. The total amount of backlog, as measured by the amount of data associated with the queue 44 of waiting I/O, might grow to exhaust the memory buffer that has been reserved for such data. In this circumstance, the simplest strategy is to delay processing of I/O until such memory is freed by an I/O completing from the laptop drive 20. In this extreme circumstance, the operating system would again experience delay through the limited performance of the laptop drive 20. Such occurrences should be logged and reported to the system administrator using the appropriate operating system facilities, to aid in system performance tuning.

Further refinements are possible though to mitigate this. One option is to attempt dynamically to grow the data buffer to support greater backlog when needed. This should be complemented by shrinking the data buffer size when the system activity reduces and the backlog is removed.

Another refinement is to discard the in-memory copy of data, and instead when an I/O is to be submitted to the laptop drive 20, read data from the up-to-date docking station 18 drive ahead of submitting it to the laptop drive 20. This can permit much larger backlog to be supported, since the only in memory record needed is the queue of write I/O that needs to be submitted to the laptop drive 20. However, care needs to be exercised in this case to ensure a consistent image of data on the laptop drive 20. Specifically, if a given sector is referenced more than once in the queue of I/O waiting to be submitted, then only the most recent image is stored on the docking station drive 18. Earlier images are retained through use of an in memory copy. In this case, the processing for a new write I/O requires searching the list of I/Os pending queued to the laptop drive 20, (most likely using a hash table or equivalent structure to minimize the cost of the search), and in the event of a collision reading the old data from the docking station drive 18 and associated said data with the newest colliding I/O in the queue 44, ahead of submitting the newly arrived I/O to the docking station drive 18 and placing it as the newest entry on the queue 44.

Further processes are required to manage the synchronization which is required when the docking station drive 18 is out-of-date with respect to the laptop drive 20, such as when the laptop 12 has been used away from the docking station 14 for a period of time, and also when the two drives 18 and 20 are first configured to be used under the filter layer 38.

There are many well-known schemes to synchronize two mirrors that can be used. Typically such schemes proceed through the entire extent of the disks' address range, copying unsynchronized data from one disk to the other. This is most efficiently performed when the computer is not being used for normal use, such as overnight, since it is a relatively expensive operation. If performed concurrently with active use, care is needed to co-ordinate I/O around regions which are simultaneously being copied and also being written, to ensure that the most recent data is written to both disks when the copy operation is complete.

After the initial synchronization operations, subsequent re-synchronization operations can be optimized by recording so called 'dirty regions' when the laptop drive 20 is again used in isolation. Such schemes are well known but an example scheme would be to divide up the entire disk surface into equal sized regions, of perhaps 256 k size, and to record for each region one of two states: whether any write has been received since the disk was synchronized that has only been sent to the laptop drive 20, where the region is said to be dirty, or whether no write has been received in which case the region is said to be clean.

When re-united with the docking station drive 18, the re-synchronization operation can omit to copy the regions that are known to be clean, and only copy the regions that are dirty, which can significantly accelerate the total copy operation duration.

The simplest scheme for recording these dirty regions is to maintain an in-memory copy of the dirty regions, and then checkpoint these to the laptop drive 20 periodically, and ahead of any planned power-down. Such a scheme is exposed however in the case of an unplanned loss of system operation—possibly following battery failure, or more likely in case of operating system failure such as a kernel crash.

To guard against such failures, a very robust scheme would checkpoint such dirty regions to non-volatile memory before allowing the first write to a clean region to be sent to the laptop drive. This non-volatile memory could be kept on the laptop drive itself, as part of the aforementioned configuration record maintained there, though this might have a significant performance impact when the system is first used after it has been synchronized, since most of the writes will also require an extra write to mark the corresponding region dirty. A small non-volatile device such as flash memory could advantageously be used to hold these marks in this case, which will mitigate any performance impact, and also make the dirty marks robust in case of most failures. Other non-volatile devices might also be used.

In view of the foregoing description it should be appreciated that the exemplary embodiments of this invention provide a system in which a control device, in a first mode, can take advantage of the functionality of first storage device while maintaining an asynchronous relationship with a second storage device, and is able to switch to a second mode of operation, without disruption, of a synchronous connection to the second storage device.

Preferably, the control device is also executing an operating system and the communications received by the filter layer emanate from the operating system. The communications (I/O's from the operating system) are routed by the filter layer to the storage devices.

Advantageously, the first storage device is included in a first computer, and the control device and the second storage device may be included in a second, portable, computer. The portable computer is docked with, for example, a docking station and is able to use the superior performance of the hard disk drive of that computer.

The control device may be arranged, upon receipt of a predetermined signal, to complete the asynchronous update of the second storage device. The asynchronous transmission of communications to the second storage device (in the laptop) will generally be behind the real-time communication with the storage device in the docking station. When a user wishes to undock from the docking station, then they need to initiate a process whereby the updating of the second storage device is completed to ensure that the two storage devices are in synch.

The control device may be arranged, when first detecting the presence of the first storage device, to synchronize the first and second storage devices. When the control device first becomes aware that two storage devices are available, then the contents of these two storage devices are synchronized to ensure that the subsequent transmissions of communications does not lead to a divergence of the contents of the storage devices.

Advantageously, the control device may be arranged, when unable to detect the presence of the first storage device, to record the communications it receives. If the portable computer (and hence the control device) is undocked from the docking station then the control device will need to record the communications that it receives in order to be able to update the hard disk in the docking station when the two computers are connected together again.

In accordance with the exemplary embodiments of this invention it is possible to treat the laptop disk drive and docking station drive as an asynchronously coupled mirror. The filter layer executed by the control device is provided that can run in a number of modes. When docked, the primary drive is the higher-performing docking station drive. Writes are committed synchronously to this drive only, which allows the using system to get the benefit of this drive's performance. In the background, the writes are sent asynchronously to the laptop's drive. These are sent so as to preserve consistency of writes to that drive. No reads are sent to the laptop drive, which will also improve its performance capability. Often, the laptop drive will be only a few writes out-of-date maybe less than a second, though it may fall a number of seconds or even minutes behind.

When undocked, the primary drive is the laptop drive. That drive's performance will define system throughput. Transitions between docked and undocked require synchronization to make the two drive's contents identical. At all times, the secondary drive is maintained as a consistent copy, some small amount of time out-of-date with respect to the primary. If the primary disk should fail, the secondary drive can be used to re-boot and recover the system with only a small amount of data lost, equivalent to a sudden loss of power shortly before the primary drive failed.

The docking station drive could be a server class drive within the desktop unit. It could also be a SAN attached drive, maybe reached over iSCSI and Gigabit Ethernet. This means the facilities of a storage controller can be used to manage this image. This allows for storage controller facilities such as FlashCopy® to be used to help perform management tasks like backup or virus checking, without imposing load on the laptop at all.

It will be clear to one skilled in the art that the method of the invention may suitably be embodied in a logic apparatus comprising logic means to perform the steps of the method, and that such logic means may comprise hardware components or firmware components.

It will be equally clear to one skilled in the art that the logic arrangement of the invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using for example, a virtual hardware descriptor language, which may be stored using fixed or transmittable carrier media.

It will be appreciated that the method described above may also suitably be carried out fully or partially in software running on one or more processors, and that the software may be provided as a computer program element carried on any suitable data carrier such as a magnetic or optical computer disc. The channels for the transmission of data likewise may include storage media of all descriptions as well as signal carrying media, such as wired or wireless signal media.

The exemplary embodiments of this invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the invention may be provided in the form of a service deployed on behalf of a customer to offer outsourced services.

It will also be appreciated that various further modifications to the preferred embodiments described above will be apparent to a person of ordinary skill in the art.

What is claimed is:

1. A method comprising:

receiving communications at a filter layer;

transmitting the communications to an up-to-date storage device;

transmitting the communications to a copy storage device which maintains a copy of the up-to-date storage device, where in a first mode, a first storage device is used as the up-to-date storage device and a second storage device is used as the copy storage device, where the second storage device operates at a higher speed than the first storage device; and in response to the higher speed second storage device being synchronized with the first storage device, entering a second mode where the second storage device is used as the up-to-date storage device and the first storage device is used as the copy storage device, where the first storage device is an internal hard drive in a laptop computer and the second storage device is a docking station hard drive;

while in the first mode, transmitting write operations to the copy storage device, where transmitting the write operations comprises recording an indication of the write operations, the indication comprising a record of dirty regions in the up-to-date storage device and, in response to the second storage device becoming accessible, transmitting the recorded indications to the copy storage device;

while in the second mode, in response to determining that the second storage device is not accessible, processing any pending write operations in the first storage device and, in response to all pending write operations being completed, entering the first mode;

in response to receiving a predetermined signal, completing an asynchronous update of the copy storage device, where the method is performed transparently to an operating system executed by the laptop computer;

sending an input/output (I/O) operation to be executed by the internal hard drive and the docking station hard drive;

sending a signal to the operating system that the I/O operation is complete when the I/O operation is completed by the docking station hard drive before the I/O operation is completed by the internal hard drive, wherein the operating system continues to operate based on completion of the I/O operation by the docking station hard drive while the I/O operation is still pending for the internal hard drive;

maintaining an I/O record in the filter layer of all I/O operations that remain to be performed by the internal hard drive;

queuing pending I/O operations of the internal hard drive in a buffer, wherein when the I/O operations in the buffer exceed a threshold, increasing a buffer size; and receiving a request to undock the laptop computer and executing, on the internal hard drive, the I/O operations in the I/O record in the filter layer.

* * * * *